(12) United States Patent
Stack et al.

(10) Patent No.: US 8,668,506 B2
(45) Date of Patent: Mar. 11, 2014

(54) CHARGER RECEPTACLE

(75) Inventors: John Stack, Shelby Township, MI (US); John F. Nathan, Highland Township, MI (US); Slobodan Pavlovic, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/095,402

(22) Filed: Apr. 27, 2011

(65) Prior Publication Data

US 2012/0276782 A1 Nov. 1, 2012

(51) Int. Cl.
*H01R 13/44* (2006.01)
(52) U.S. Cl.
USPC ........................................... 439/136
(58) Field of Classification Search
USPC ........... 439/660, 304, 144, 142, 222, 34, 455, 439/133, 314; 320/2
See application file for complete search history.

(56) References Cited

U.S. PATENT DOCUMENTS

| 4,067,105 | A | * | 1/1978 | Zahn et al. ........................ 29/869 |
| 4,782,968 | A | * | 11/1988 | Hayes ............................ 215/276 |
| 4,784,610 | A | * | 11/1988 | Stuart ............................ 439/144 |
| 5,271,566 | A | * | 12/1993 | Dederich ......................... 239/600 |
| 5,314,355 | A | * | 5/1994 | Halvonik ......................... 439/638 |
| 5,401,174 | A | * | 3/1995 | Hansen ............................ 439/34 |
| 5,443,389 | A | * | 8/1995 | Hughes ............................ 439/35 |
| 5,469,617 | A | * | 11/1995 | Thomas et al. ................ 29/889.21 |
| 5,492,264 | A | * | 2/1996 | Wadleigh ...................... 228/112.1 |
| 5,545,046 | A | * | 8/1996 | Masuda et al. ................. 439/142 |
| 5,556,284 | A | * | 9/1996 | Itou et al. ......................... 439/34 |
| 5,577,920 | A | * | 11/1996 | Itou et al. ......................... 439/34 |
| 5,588,853 | A | * | 12/1996 | Anthony ........................ 439/136 |
| 5,627,448 | A | * | 5/1997 | Okada et al. .................... 439/133 |
| 5,641,310 | A | * | 6/1997 | Tiberio, Jr. ..................... 439/680 |
| 5,713,706 | A | * | 2/1998 | Lozano .......................... 411/171 |
| 5,829,664 | A | * | 11/1998 | Spinella et al. ............. 228/112.1 |
| 5,951,309 | A | * | 9/1999 | Hopper .......................... 439/142 |
| 6,083,040 | A | * | 7/2000 | Mosquera ..................... 439/548 |
| 6,302,726 | B1 | * | 10/2001 | Marechal ....................... 439/491 |
| 6,540,193 | B1 | * | 4/2003 | DeLine .......................... 248/481 |
| 6,554,175 | B1 | * | 4/2003 | Thompson ................. 228/112.1 |
| 6,602,090 | B2 | * | 8/2003 | Kato ............................. 439/455 |
| 7,097,490 | B2 | * | 8/2006 | Eaton et al. .................... 439/350 |
| 7,128,616 | B1 | * | 10/2006 | Orr et al. ....................... 439/651 |
| 7,431,194 | B2 | * | 10/2008 | Slattery ...................... 228/112.1 |
| 7,461,769 | B2 | * | 12/2008 | Waldron et al. ................ 228/2.1 |
| 7,527,893 | B2 | * | 5/2009 | Larsen .......................... 429/100 |
| 7,575,450 | B2 | * | 8/2009 | Williams et al. ............. 439/144 |
| 7,726,542 | B2 | * | 6/2010 | Kleber ....................... 228/112.1 |
| 7,794,280 | B1 | * | 9/2010 | Markyvech .............. 439/620.29 |
| 7,854,363 | B2 | * | 12/2010 | Slattery et al. ............. 228/112.1 |
| 7,878,866 | B1 | | 2/2011 | Kwasny et al. |
| 7,938,310 | B2 | * | 5/2011 | Kleber ....................... 228/114.5 |
| 7,988,453 | B2 | * | 8/2011 | Loo et al. ........................ 439/34 |
| 8,016,604 | B2 | * | 9/2011 | Matsumoto et al. .......... 439/304 |
| 8,123,535 | B1 | * | 2/2012 | Yeon ............................ 439/101 |
| 8,156,867 | B2 | * | 4/2012 | Stimpson ..................... 102/377 |
| 2002/0081486 | A1 | | 6/2002 | Williams |
| 2008/0011180 | A1 | * | 1/2008 | Stimpson ..................... 102/377 |
| 2010/0201309 | A1 | | 8/2010 | Meek |
| 2010/0238006 | A1 | | 9/2010 | Grider et al. |
| 2011/0043355 | A1 | | 2/2011 | Chander et al. |

* cited by examiner

*Primary Examiner* — Alwxander Gilman
(74) *Attorney, Agent, or Firm* — Brooks Kushman, P.C.

(57) ABSTRACT

A charging receptacle having a barrel and a base configured to facilitate interconnecting electrical elements of a cordset with a vehicle charging system. The barrel may be configured to facilitate alignment of the electrical elements and the base may be configured to facilitate mounting the charger receptacle to a vehicle or other device having a system reliant on electrical energy provided through the cordset.

6 Claims, 2 Drawing Sheets

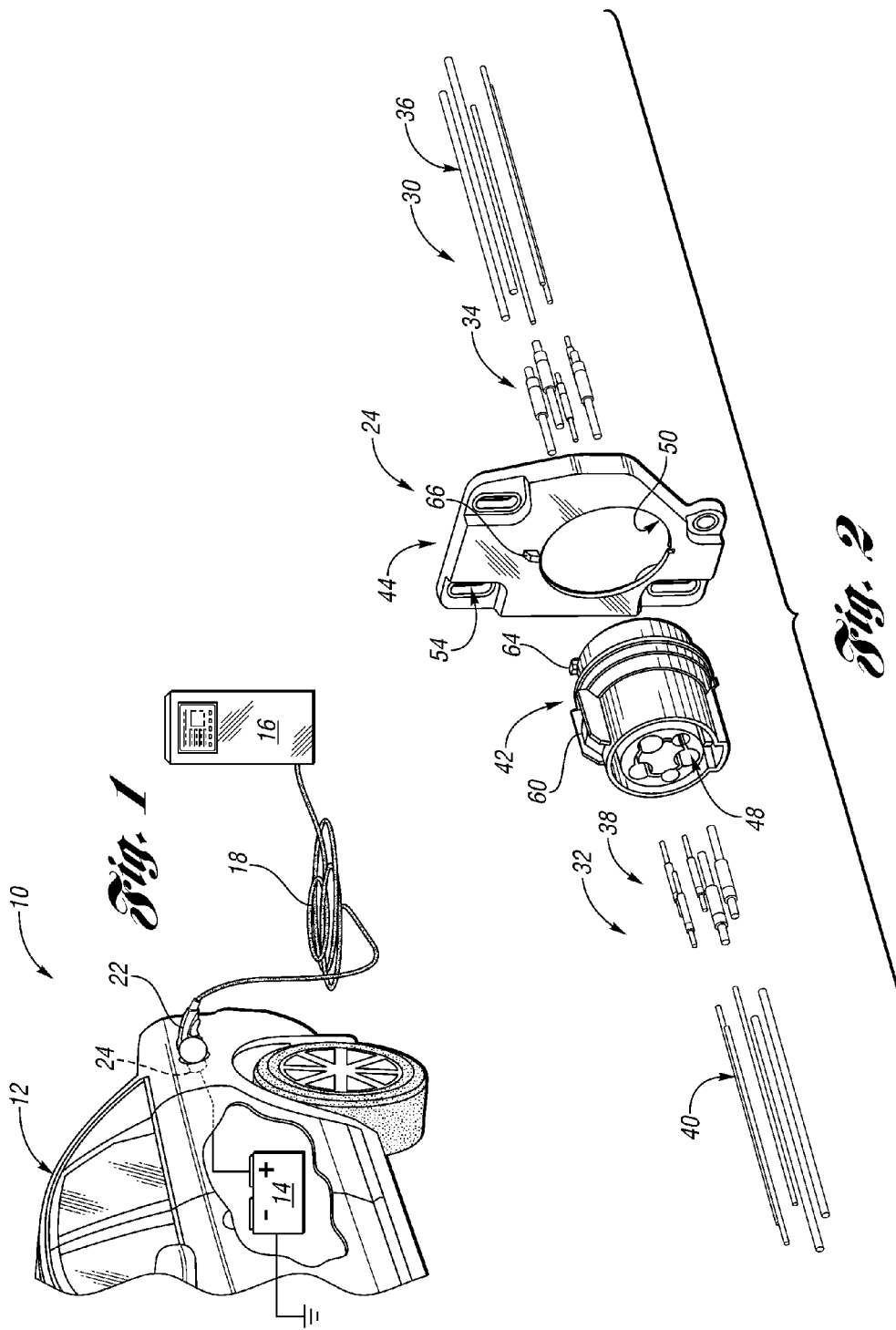

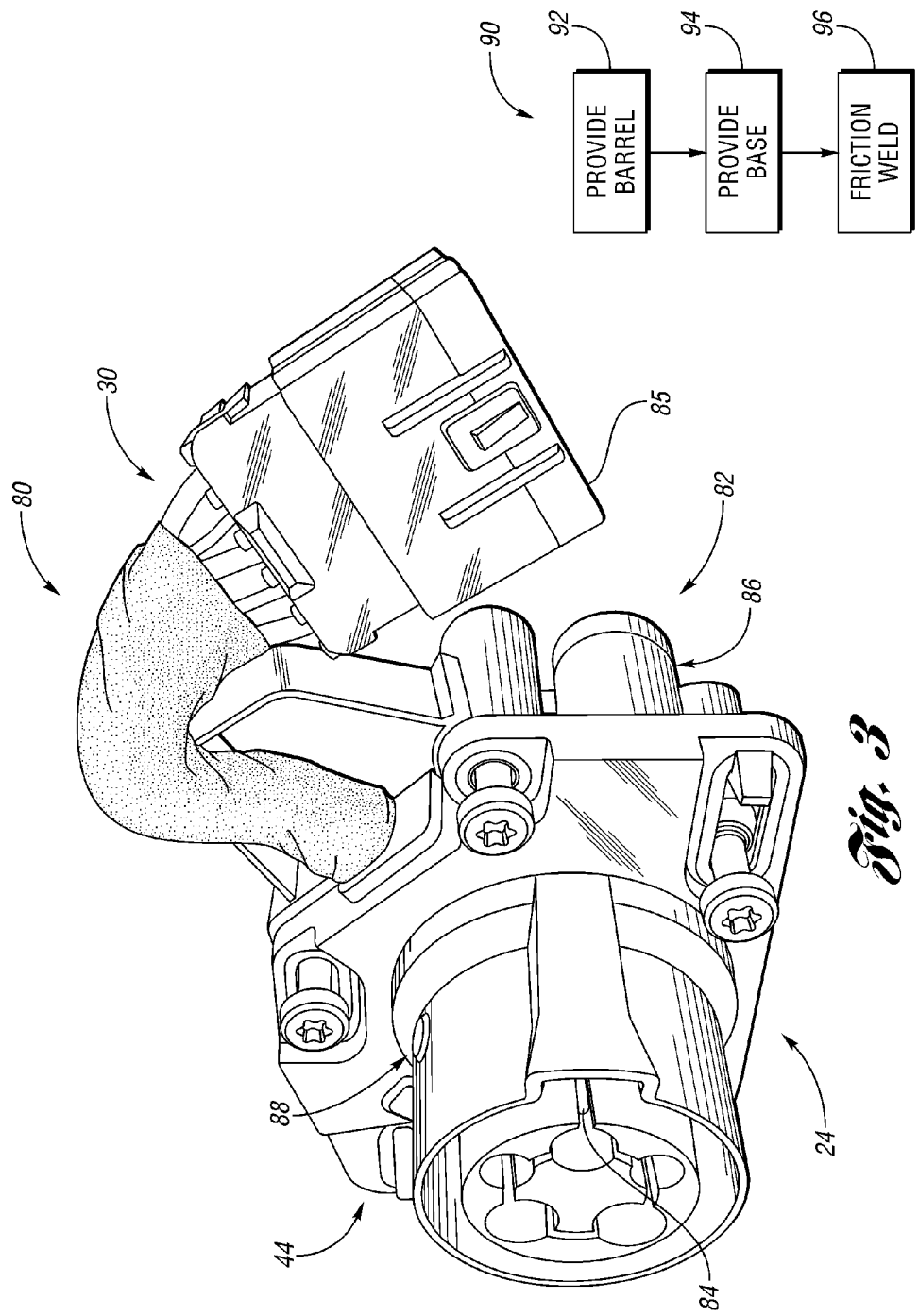

CHARGER RECEPTACLE

TECHNICAL FIELD

The present invention relates to charger receptacles configured to facilitate interconnecting a cordsets with an electrical system, such as by guiding electrical terminals of the cordset relative to electrical terminals of the electrical system.

BACKGROUND

Some mobile devices, such as but not limited to vehicles, computers, and mobile phones, rely on a chargeable battery or other energy source to provide some or all of its required operating energy while the mobile device is disconnected from a continuous source of electrical energy, e.g., a wall outlet or other charging station. A cordset or other physical connection member may be used to facilitate delivery of current from the charging station to a charging system of the mobile device in order to facilitate charging the chargeable battery. In order to deliver current through the cordset to a charging system of the mobile device, at least one conducting element of the cordset must be electrically connected with at least one conducting element of the charging system.

SUMMARY

One non-limiting aspect of the present invention contemplates configuring an adaptor of a cordset and/or a receptacle of a charging system to facilitate interconnecting at least one cordset conducting element with at least one charging system conducting element.

One non-limiting aspect of the present invention contemplates a charger receptacle configured to facilitate interconnecting a cordset having a plurality of cordset electrical terminals with a corresponding plurality of vehicle electrical terminals of a vehicle charging system. The charger receptacle include: a barrel having a plurality of connection openings shaped to guide the plurality of cordset electrical terminals into an electrically conducting mating arrangement with the plurality of vehicle electrical terminals; and a base connected to the barrel, the base having a plurality of fastener openings shaped to receive fasteners used to fasten the base to the vehicle charging system.

One non-limiting aspect of the present invention contemplates the base being connected to the barrel with a weld.

One non-limiting aspect of the present invention contemplates the weld being a spun weld.

One non-limiting aspect of the present invention contemplates the barrel being comprised of a molded plastic.

One non-limiting aspect of the present invention contemplates the base being connected to the barrel after the barrel is molded.

One non-limiting aspect of the present invention contemplates the base being comprised of a material different than the molded plastic material of the barrel.

One non-limiting aspect of the present invention contemplates the barrel including a first alignment element and the base includes a second alignment element, the first alignment element aligning with the second alignment element when the barrel is connected to the base.

One non-limiting aspect of the present invention contemplates the first alignment element being a tab.

One non-limiting aspect of the present invention contemplates the second alignment element being a tab.

One non-limiting aspect of the present invention contemplates an outer perimeter of the barrel connected to the base being predominately cylindrical.

One non-limiting aspect of the present invention contemplates the first alignment element extending exteriorly away from the outer perimeter of the base.

One non-limiting aspect of the present invention contemplates the barrel including a retaining element at an end opposite of the base, the retaining element configured to be removably interlocked with the cordset.

One non-limiting aspect of the present invention contemplates a charger receptacle configured to facilitate interconnecting a cordset having a first plurality of electrical terminals with a corresponding second plurality of electrical terminals of an electrical system. The charger receptacle may include: a barrel having a plurality of connection openings shaped to guide the first plurality of electrical terminals relative to the second plurality of electrical terminals; and a mounting base separately connected to the barrel.

One non-limiting aspect of the present invention contemplates the mounting base being separately connected to the barrel with a spun weld.

One non-limiting aspect of the present invention contemplates a method of manufacturing a charger receptacle, the charger receptacle configured to facilitate interconnecting a cordset having a first plurality of electrical terminals with a second plurality of electrical terminals of an electrical system, the charger receptacle having a barrel and a base, the barrel having a plurality of connection openings shaped to guide the first plurality of electrical terminals into an electrically conducting mating arrangement with the second plurality of electrical terminals of the electrical system and the based being configured to be mounted to the electrical system. The method may include: frictionally heating an interface between the barrel and the base to a temperature sufficient to cause formation of a welded connection therebetween.

One non-limiting aspect of the present invention contemplates a portion of the barrel proximate the interface being cylindrical and a portion of the base proximate the interface having a matching cylindrical opening.

One non-limiting aspect of the present invention contemplates frictionally heating the interface by one of spinning the barrel relative to the base and spinning the base relative to the barrel.

One non-limiting aspect of the present invention contemplates spinning the one of the base and the barrel such that a first alignment feature on the barrel aligns with a second alignment feature on the base.

One non-limiting aspect of the present invention contemplates positioning at least a portion of the barrel within the base prior to frictionally heating the interface.

One non-limiting aspect of the present invention contemplates molding the barrel prior to molding the base.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a charging system in accordance with one non-limiting aspect of the present invention.

FIG. 2 illustrates a charging receptacle in accordance with one non-limiting aspect of the present invention.

FIG. 3 illustrates a charging terminal receptacle assembly in accordance with one non-limiting aspect of the present invention.

FIG. 4 illustrates a flowchart of a method for manufacturing a charging receptacle in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a system 10 where a vehicle 12 having a vehicle charging system 14 is provided energy from a wall outlet or charging station 16 in accordance with one non-limiting aspect of the present invention. A cordset 18 having plurality of conducting wires and/or other conducting elements may be configured to deliver current between the charging station 16 and the vehicle charging system 14. One end of the cordset 18 may include a connector assembly 22 configured to be received within a charging receptacle 24 associated with the vehicle charging system, such as but not limited to the connector assembly 22 described in U.S. Pat. No. 7,878,866, the disclosure of which is hereby incorporated by reference in its entirety by reference.

The charging receptacle 24 may be configured to facilitate establishment of an electrical connection between a plurality of electrically conducting elements of the vehicle charging system 14 and the charging station 16. The charging receptacle 24 may facilitate the desired electrical connection by providing interconnecting conducting elements and/or by guiding the vehicle charging system and cordset conducting elements into a mating arrangement with each other. The charging receptacle 24 may be configured to support a multiple pin or port connection methodology for facilitating electrically interconnecting the vehicle charging system and cordset conducting elements, including but not limited to that specified in Society of Automotive Engineer (SAE) J1772 and International Electrotechnical Commission (IEC) 51851.

FIG. 2 illustrates the charging receptacle 24 as contemplated by one non-limiting aspect of the present invention. The illustrated charging receptacle 24 may be configured to facilitate electrically interconnecting vehicle charging system conducting elements 30 with cordset 18 connecting conducting elements 32 by guiding the elements into engagement with each other. The vehicle charging system 14 is shown as having the conducting elements 30 configured into an arrangement of five pin-shaped terminals 34 being connected to five corresponding conducting wires 36, which lead to related features of the vehicle charging system 14 or to other vehicle subsystems. The cordset conducting elements 32 are shown as being configured as five open-ended terminals 38 being connected at one end to five conducting wires 40 of the cordset 18. The vehicle charging system and/or cordset conducting elements/terminals 34, 38 may, for example, correspond with those disclosed in U.S. application Ser. Nos. 13/073,478; 13/080,982; 13/070,576; and 13/080,753, the disclosures of which are hereby incorporated by reference in their entirety.

The charging receptacle 24 includes a barrel 42 and a base 44. Each may be comprised of plastic or non-plastic parts formed in a molding operation, such as by injection molding. The barrel 42 may include a plurality of through-hole openings 48 shaped to guide the cordset terminals 38 relative to the corresponding vehicle charging system pins 34. The base 44 may include an opening 50 for receiving the barrel 42. The base 44 may include a plurality of fastener openings 54 through which fasteners may be received to facilitate mounting the charger receptacle 24 to the vehicle charging system 14 or some other portion of the vehicle 12. Optionally, the barrel 42 may not include any features (e.g., fastener openings) for direct mounting to the vehicle. The barrel 42 may include a locking element 60 operable with a latch or other locking feature (not shown) on the cordset 18 to secure the cordset 18 to the charging receptacle 24 in a removable manner.

The barrel 42 may include a first alignment feature 64 that is to be aligned with a second alignment feature 66 on the base 44. The first and second alignment features 64, 66 may be tabs (as shown) or other protrusions and/or optically apparent features (bar code, target, etc.). The first alignment feature 64 is shown to be on an outer cylindrical portion of the barrel 42 and the second alignment feature 66 is shown to be proximate the opening 50 in the base 44 used to receive the barrel 42. The proper alignment of the alignment features 64, 66 may be checked to insure the barrel 42 is properly positioned within the base 44 and/or relative to the fastener openings 54. The ability to maintain tight dimensional values between the barrel 42 and base 44, e.g., through the proper rotational alignment of the alignment features 64, 66, can be helpful in ameliorating wear and tear on the conducting elements 30, 32 when the conducting elements 30, 32 are repeatedly engaged and disengaged from each other.

FIG. 3 illustrates a charging terminal receptacle assembly 80 in accordance with one non-limiting aspect of the present invention. The assembly 80 illustrates the charging receptacle 24 and the vehicle charging system components 82 as assembled (one pin 84 shown and conducting elements 30). A connector 85 may be included at one end of the vehicle charging system conductors 30 to facilitate an additional connection to additional vehicle charging system conducting elements (not shown). A bottom base 86 may be connected to the base 44 to create a component housing.

One non-limiting aspect of the present invention contemplates frictionally heating the barrel 42 to the base 44, such as through a spin welding operation where the barrel 42 is spun within the opening 50 in the base 44. The friction generated during spinning may be sufficient to temporarily melt the adjoining materials to form a weld 88 therebetween. Of course, the present invention is not intended to be limited to frictional welding and fully contemplates, gluing, soldering, and other means for connecting the barrel to the base.

FIG. 4 illustrates a flowchart 90 of a method for manufacturing the charging receptacle 24 in accordance with one non-limiting aspect of the present invention. Block 92 relates to providing and/or manufacturing the barrel 42. The barrel 42 may be manufactured into the illustrated configuration in a molding or other forming process. The barrel 42 may be manufactured of a first material, such as but not limited to plastic. The barrel 42 is shown to be formed without the vehicle charging pins 34, however, the vehicle charging pins 34 may be injection molded in to the barrel 42 at the same time of manufacture. The barrel 42 may be manufacture in mass using a dedicated mold. The dedicated mold may be checked for specific tolerance compliance to insure each opening 48 and/or pin 34, if included, is properly positioned Block 94 relates to providing the base 44. The base 44 may be manufactured into the illustrated configuration in a molding or other forming process. The base 44 may be manufactured of a second material, which may be same as the first material and/or different material (e.g., the second material may be have different performance characteristics than the first material). The use of a different, second material may be beneficial in reducing costs and/or manufacturing demands since it may not require the robustness and tolerance performance of the barrel 42. The separate manufacture of the base 44 may also be beneficial since it can be specifically tailored/changed to each desired application without having to significantly re-check tolerancing since it can be combined with the mass produce, and tightly tolerance, barrel 42, assuming the barrel 42 is properly positioned within the opening 50.

Block 96 relates to friction welding, or otherwise connecting, the barrel 42 to the base 44. A robot or machine may be configured to automatically weld the barrel 42 to the base 44. The robot may rely on the first and second alignment features 64, 66 to control a spin of the barrel 42 and/or base 44 during the welding process in order to insure proper positioning of the barrel 42 (e.g., the openings used to guide the cordset conducting elements) to a desired datum of the base 44 (e.g., the openings used to receive the fasteners). The alignment features 64, 66 may also be used to identify the barrel 42 and base 44, such as if optical alignment features are used. During assembly, the robot may select the barrel 42 and then arbitrate between different bases 44 depending on the assembly being manufactured such that the robot may be configured to automatically manufacture charging receptacles 24 having the same barrel 42 but differently configured/orientated bases 44.

The method is described with respect to a multi-step operation where the barrel 42 and base 44 are separately provided, i.e., as individual and distinct components. The present invention, however, is not necessarily so limited and fully contemplates forming the barrel 42 and base 44 during the same forming operation such that the parts are integrally formed as the same component. One non-limiting aspect of the present invention contemplates maintaining a tight tolerance variation between the barrel 42 and the base 44. There are an infinite number of injection molding and other forming techniques that may be used to achieve tight tolerances when forming the barrel 42 and base 44 as one part.

At least one aspect of the present invention contemplates deviating from known tolerance control measures of a single-stage forming operation with a multi-step process where the barrel 42 is separately manufactured from the base 44. While the additional processing associated with separately forming the barrel and base and thereafter joining them in assembly may be more expensive and/or time consuming, the present invention believes the cost to do so can be offset with improved tolerance performance. Rather than having a mold used to form the barrel needing to be redone or troubleshot for each new configuration of the base 44 (e.g., the barrel 42 may be the same across multiple use platforms with only be configuration of the base 44 changing to facilitate mounting to different types of systems), the present invention is able to mass manufacture the barrel 42 and simply align it with a new base 44.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of manufacturing a charger receptacle, the charger receptacle configured to facilitate interconnecting a cordset having a first plurality of electrical terminals with a second plurality of electrical terminals of an electrical system, the charger receptacle having a barrel and a base, the barrel having a plurality of connection openings shaped to guide the first plurality of electrical terminals into an electrically conducting mating arrangement with the second plurality of electrical terminals of the electrical system and the based being configured to be mounted to the electrical system, the method comprising:

frictionally heating an interface between the barrel and the base to a temperature sufficient to cause formation of a welded connection therebetween, wherein frictionally heating the interface is by one of spinning the barrel relative to the base and spinning the base relative to the barrel such that a first alignment feature on the barrel aligns with a second alignment feature on the base, such that the base and the barrel have a desired rotational alignment relative to each other.

2. The method of claim 1 wherein a portion of the barrel proximate the interface is cylindrical and a portion of the base proximate the interface has a matching cylindrical opening.

3. The method of claim 1 further comprising positioning at least a portion of the barrel within the base prior to frictionally heating the interface.

4. The method of claim 1 further comprising molding the barrel prior to molding the base.

5. The method of claim 1 wherein the barrel is manufactured of a first material and the base is manufactured of a second material.

6. The method of claim 5 wherein the first material and second material are dissimilar.

* * * * *

UNITED STATES PATENT AND TRADEMARK OFFICE
CERTIFICATE OF CORRECTION

PATENT NO.         : 8,668,506 B2                                    Page 1 of 1
APPLICATION NO.    : 13/095402
DATED              : March 11, 2014
INVENTOR(S)        : John Stack et al.

It is certified that error appears in the above-identified patent and that said Letters Patent is hereby corrected as shown below:

In the Claims

Column 6, Lines 26-27, Claim 1:

After "electrical system and the"
Delete "based" and insert -- base --.

Signed and Sealed this
Tenth Day of June, 2014

Michelle K. Lee
*Deputy Director of the United States Patent and Trademark Office*